(12) United States Patent
Shiue et al.

(10) Patent No.: US 6,650,091 B1
(45) Date of Patent: Nov. 18, 2003

(54) HIGH CURRENT PULSE GENERATOR

(75) Inventors: Lih-Ren Shiue, Hsinchu (TW); Abel Sun, Taipei (TW); Hsing-Chen Chung, Hsinchu (TW)

(73) Assignee: Luxon Energy Devices Corporation, Taipei (TW)

( * ) Notice: Subject to any disclaimer, the term of this patent is extended or adjusted under 35 U.S.C. 154(b) by 1 day.

(21) Appl. No.: 10/063,794

(22) Filed: May 14, 2002

(51) Int. Cl.$^7$ ............................................... H01M 10/46
(52) U.S. Cl. ......................................... 320/166; 363/59
(58) Field of Search ................................. 320/166, 167, 320/160; 363/59, 62, 63

(56) References Cited

U.S. PATENT DOCUMENTS

| | | |
|---|---|---|
| 4,162,417 A | 7/1979 | Grudzinski |
| 4,258,405 A | 3/1981 | Steingroever |
| 4,541,081 A | 9/1985 | Smith |
| 4,994,160 A | 2/1991 | Doevenspeck |
| 5,051,613 A | 9/1991 | Houser, Jr. et al. ...... 307/296.3 |
| 5,105,329 A | 4/1992 | Goldner |
| 5,200,572 A | 4/1993 | Bissonnette et al. |
| 5,359,279 A | 10/1994 | Gidon et al. |
| 5,511,715 A | 4/1996 | Crutcher et al. |
| 5,729,562 A | 3/1998 | Birx et al. |
| 5,839,446 A | 11/1998 | Waner et al. |
| 5,895,584 A | 4/1999 | Sakota |
| 5,911,350 A | 6/1999 | Bolger et al. |
| 6,058,029 A | 5/2000 | Itow et al. |
| 6,063,168 A | 5/2000 | Nichols et al. |
| 6,075,331 A | 6/2000 | Ando et al. ................... 318/376 |
| 6,146,114 A | 11/2000 | Nardacci |
| 6,155,472 A | 12/2000 | Déziel |
| 6,169,673 B1 | 1/2001 | McIntyre et al. ............. 363/59 |
| 6,204,592 B1 | 3/2001 | Hur |
| 6,359,424 B2 | 3/2002 | Iida et al. |

FOREIGN PATENT DOCUMENTS

| | | |
|---|---|---|
| DE | 621 927 | 11/1935 |
| DE | 19 33 315 | 1/1971 |
| DE | 44 21 540 | 1/1995 |
| DE | 100 00 246 | 12/2000 |
| FR | 1 326 043 | 5/1963 |
| GB | 291 184 | 5/1928 |
| GB | 588 872 | 6/1947 |
| GB | 596 337 | 1/1948 |
| WO | WO 01 71895 | 9/2001 |

*Primary Examiner*—Edward H. Tso
(74) *Attorney, Agent, or Firm*—Jiang Chyun IP Office

(57) ABSTRACT

The present invention provides a high current pulse generator for DC powered devices. The generator includes batteries as the power source that charges supercapacitors as well as provides power to the loads as required. During charging, the supercapacitors are connected in parallel, but they are switched to series connection by relays at the moment that the loads demand large currents. No other controlling means except for relays in the circuit is employed, so that the electric arrangement is simple, reliable, and cost-effective. As the batteries are designed to deliver currents at low discharge rates, the effective use-time of batteries is prolonged. Furthermore, due to the high power densities of supercapacitors, the readily available alkaline batteries can be utilized in the power unit for electric power tools.

10 Claims, 3 Drawing Sheets ately, the tools are powered by batteries. Similar to AC powered tools, the DC powered tools utilize solenoid actuators in driven applications as well. In U.S. Pat. No. 5,105,329 issued to Goldner, which is included herein by reference, a solid-state circuitry is provided for driving the armature of a battery operated electric stapler. As batteries are the sole power source for a DC stapler, the effective operating lifetime of batteries is addressed by "329 by means of a complex circuit using a number of electronic components. Nowadays, many commercial cordless power

HIGH CURRENT PULSE GENERATOR

BACKGROUND OF INVENTION

1. Field of Invention

The present invention relates to a compact power module for generating impulses of high current for driving electric motors to create impulse torque in short duration, thereby energizing hand-held tools, igniting combustion engines, or actuating automatic systems. More specifically, the present invention relates to a switching capacitor without moving parts wherein supercapacitors, ultracapacitors, or electric double layer capacitors are configured from parallel connection during charging phase to series connection at the time of use by electromagnetic switching elements to discharge for generating the desired impulses.

2. Description of Related Art

Impulse energy is very useful in numerous industries. For example, it can be used for crushing stones (U.S. Pat. No. 6,058,029), for vaporizing metal (U.S. Pat. No. 5,359,279), for removing pollutant particles (U.S. Pat. No. 4,162,417), and for collecting blood sample (U.S. Pat. No. 5,839,446).

Many techniques can be used to generate impulse energy, for example, seawater and membrane used in submarine torpedo launch systems for producing a high velocity fluid flow in a very short duration (U.S. Pat. Nos. 5,200,572 and 6,146,114). High energy pulses can also be generated by using acoustic transducer (U.S. Pat. No. 4,541,081), piezoelectric transducer (U.S. Pat. No. 6,204,592) and flywheel (U.S. Pat. No. 5,511,715). Nevertheless, impulse energy is most commonly generated using electrical circuitry as in U.S. Pat. Nos. 4,258,405; 4,994,160; 5,359,279; 5,729,562; 5,895,584; 6,058,029; 6,063,168 and 6,359,424. Though capacitor is universally included in the prior art electric impulse generators, various semiconductor switching devices, such as, thyratron, thyristor, IGBT or SCR, as well as coil, transformer and microcontroller of pulse width modulation (PWM) are employed for switching the capacitor. Because of the chip count in the prior art electric impulse generators is high, the resultant electrical arrangements are thus bulky and costly. Moreover, thyratron has a lifetime problem associated with cathode and anode erosion that can reduce switching efficiency and voltage hold-off ability of the semiconductor element.

Impulse force is also required for operating portable hand held tools including stapler, nailer, tacker, drill, hammer, pinner, breaker, nibbler, compactor, hedger, trimmer, and pruner, etc. Taking nailer or stapler as an example, it is conventionally pneumatically powered by compressed air (U.S. Pat. No. 6,155,472) or by pressurized fuel gas (U.S. Pat. No. 5,911,350) to charge the spring to a compressed position for driving a nail into wood or concrete surface. The aforementioned tools hence need a job site compressor or a combustion chamber that impairs the mobility of the tools. To bestow the portable tools the highest mobility, the tools should have no string attached thereto or be cordless, and preferably, the tools are powered by batteries. Similar to AC powered tools, the DC powered tools utilize solenoid actuators in driven applications as well. In U.S. Pat. No. 5,105,329 issued to Goldner, which is included herein by reference, a solid-state circuitry is provided for driving the armature of a battery operated electric stapler. As batteries are the sole power source for a DC stapler, the effective operating lifetime of batteries is addressed by "329 by means of a complex circuit using a number of electronic components. Nowadays, many commercial cordless power tools rely at first on NiCd batteries and then switch to NiMH batteries on environmental cause for driving the electric motors of tools. However, batteries are limited to their power densities that they are unable to deliver the required impulse torque for heavy-duty jobs, or the effective use-time of batteries is reduced due to overdraft of power. This invention provides a cost-effective method using supercapacitors and electromagnetic relays to solve the foregoing problems related to the electric impulses generation.

SUMMARY OF INVENTION

The present invention utilizes supercapacitors as load leveling for batteries in DC powered devices. Therefore, the number of batteries required for powering the devices can be reduced, or the effective operating time of batteries can be prolonged. When alkaline batteries are employed in the power units of DC powered devices, no wait time is required for charging batteries so that the devices can perform immediately.

The present invention uses a minimum number of batteries, but sufficient to charge the supercapacitors. When the loads demand large currents, the supercapacitors will promptly supply the required power, leaving batteries isolated or under a condition of low discharge rate.

The present invention uses only electromagnetic relays as the switching element to switch the supercapacitors from parallel connection to series connection for delivering electric impulses. The relays are small and inexpensive. Thereby, the impulse generator consisting of supercapacitors and relays is compact and cost-effective.

The present invention controls the capacitance and ESR (equivalent series resistance) of the supercapacitors so that the magnitude of impulse force (or impulse torque) provided by the generator is tailor-made.

These and other features, objectives as well as advantages in accordance with the present invention will become apparent from the following detailed description, and from preferred embodiments with the accompanying drawings.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Supercapacitors are energy-storage devices of electrochemical cells that can store static charges up to thousands of farads (F) via surface adsorption or surface redox (reduction and oxidation). For adsorption, the charges stored are termed double layer capacitance (DLC), while pseudocapacitance (PC) is given for the charges stored by means of surface redox. Generally, carbonaceous materials are observed to have DLC only, and metal oxides are often seen to have both DLC and PC. Because of the foregoing difference in storing charges, capacitors using carbons as the electrode materials are named supercapacitors or electric double layer capacitors, whereas capacitors using metal oxides as the electrode materials are so called ultracapacitors. Nevertheless, all of the aforementioned capacitors have high energy densities compared to the conventional capacitors, and they all possess high power densities compared to the batteries. Most importantly, they are all suitable for making the high current pulse generator as presented in the current invention.

Due to high energy densities, supercapacitors can be charged by any magnitude of current as long as the rated voltages (10% tolerance) of supercapacitors are not exceeded. To serve as an electric impulse provider, the element employed should be capable of storing energy and releasing energy in a very short duration at request. In addition to supercapacitor, flywheel and inductor are alternative candidates and they are frequently utilized for delivering energy pulses. However, flywheel requires a driving motor and other moving parts to operate, while inductor has hysteresis and is seldom used alone. On the contrary, supercapacitors receive and release energy in real-time response without moving parts and delay. Moreover, supercapacitors can literally perform charging and discharging for years without the need of maintenance. Therefore, supercapacitors are better devices than flywheels on delivering electric impulses.

Figure 1:
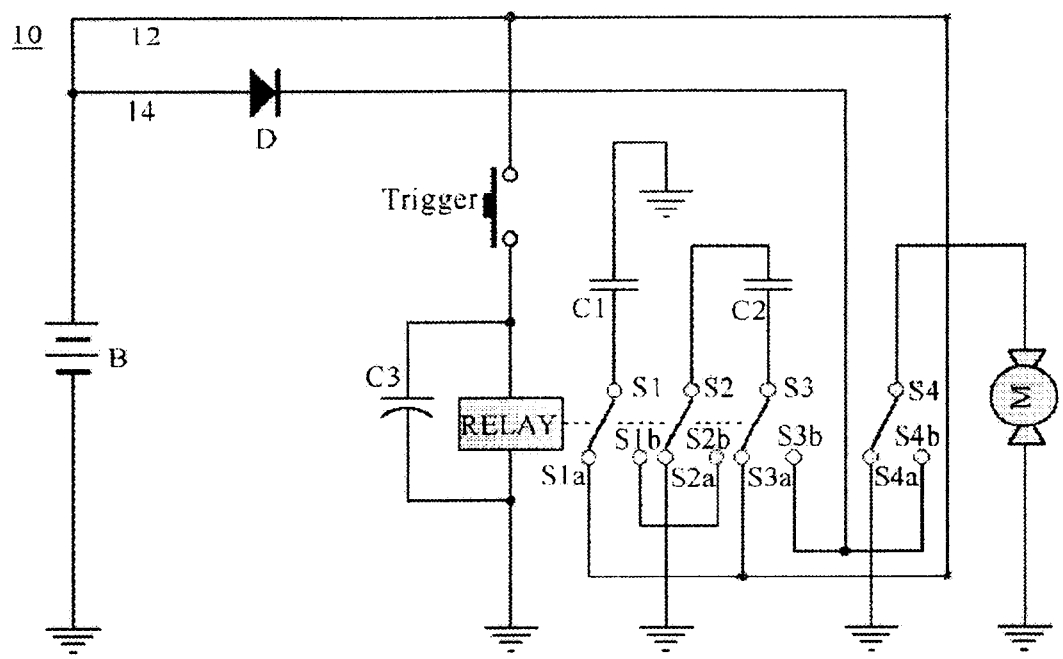
FIG. 1 is a schematic diagram illustrating that supercapacitors are connected in parallel during charging and they are switched to series connection for delivering electric impulses upon pulling the trigger according to one preferred embodiment of this invention.

FIG. 1 is a schematic diagram illustrating that supercapacitors are connected in parallel during charging and they are switched to series connection for delivering electric impulses upon pulling the trigger. FIG. 1 is based on the first preferred embodiment of the present invention on generating electric impulses for driven applications such as stapler, nailer, tacker, hammer and trimmer. The electric impulse generator 10 comprises battery B as a voltage source, supercapacitors C1 and C2 as an energy storage unit, and a 4-port (S1 to S4 as common contacts) electromagnetic relay for switching the supercapacitors to discharge position. Each port of the relay has a single-pole, double-throw (SPDT). Four sets of 12 contacts of the relay are normally closed (S1$a$-S1, S2$a$-S2, S3$a$-S3 and S4$a$-S4), while the other sets are normally open (S1-S1$b$, S2-S2$b$, S3-S3$b$ and S4-S4$b$). During charging phase, a DC current will flow form battery B in power line 12 through contacts S1$a$ and S3$a$ to charge supercapacitors C1 and C2, respectively. While the supercapacitors are charged by the battery, motor M is grounded by way of S4 and S4$a$. Since C1 and C2 are connected in parallel for charging, the voltage of battery B is designed to be slightly larger than that of supercapacitors C1 and C2, but much lower than the voltage required for driving M. Henceforth, the dimension and quantity of battery can be reduced. In order to save the energy of the battery, there is a push-latching button (not shown in FIG. 1) for initiating the charging of supercapacitors before using the tools. While the tools are in storage, battery is isolated from the supercapacitors and the motor. At the time of using the tools, the latching button is pushed and trigger is pulled to switch the electromagnetic relay from normally closed to normally open. Consequently, the supercapacitors C1 and C2, as well as the motor M are all connected in series. Immediately the supercapacitors discharge to produce a high current to impart impulse torque to the motor for driving the spring mechanism suddenly to a spring-compressed position, in order to drive a staple from a staple magazine. After firing a staple, the spring mechanism automatically returns to the original position, ready for the next operation. In FIG. 1, the diode D is to protect battery B from back charging, while capacitor C3 is a conventional capacitor used for absorbing voltage surge that may occur.

Figure 2:
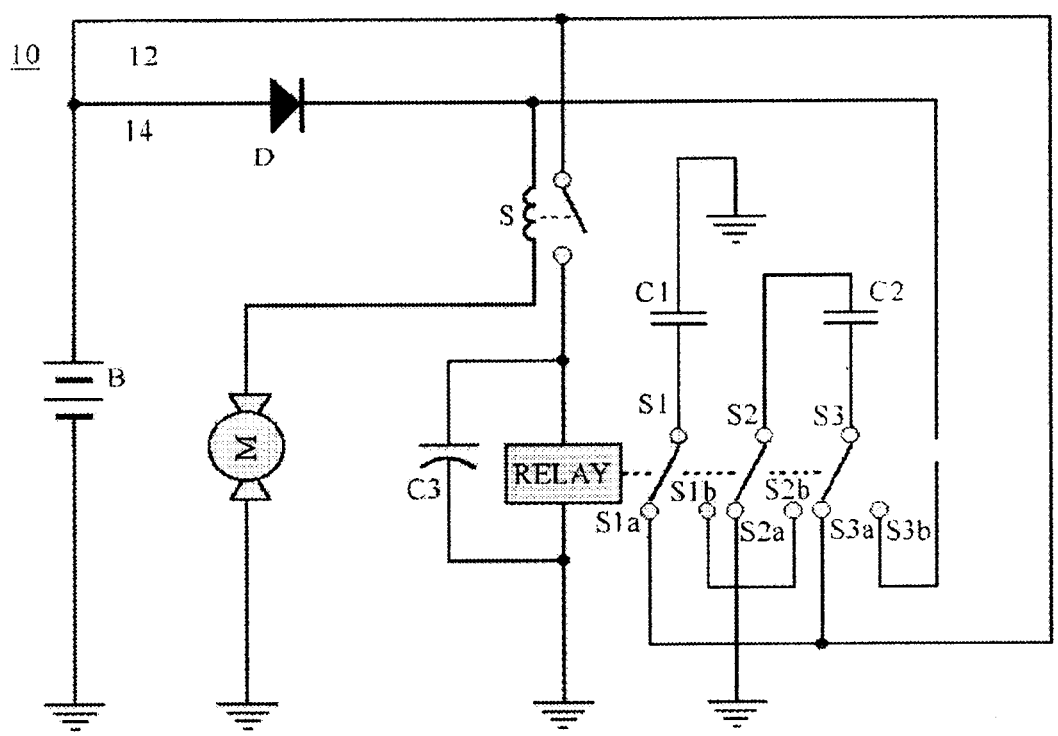
FIG. 2 is a schematic diagram illustrating that supercapacitors can discharge to assist battery to meet the power demand at the request of load according to another one preferred embodiment of this invention.

FIG. 2 is a schematic diagram illustrating that supercapacitors can discharge to assist battery to meet the power demand at the request of load according to another one preferred embodiment of this invention. FIG. 2 is based on the second embodiment of the present invention for generating high current pulse to meet an increasing power demand of loads, such as, the motor of power drills, the engine of motorcycles and automobiles, as well as the actuator of automatic systems. Similar to FIG. 1, the high current pulses generator 20 also comprises battery B as a voltage source, supercapacitors C1 and C2 as an energy storage unit, and a SPDT, 3-port electromagnetic relay for switching the supercapacitors to discharge position. However, a solenoid S is included in the generator of FIG. 2, and battery B supplies a DC current that is within the normal discharge rates of battery for charging the supercapacitors, as well as for driving the motor M that requires low power for initial operation. During charging phase, with the relay at normally closed (S1$a$-S1, S2$a$-S2 and S3$a$-S3) state the supercapacitors C1 and C2 are connected in parallel, and the DC current flowing through S is below the turn-on threshold of the device. As the power demand of M increases, for example, at the moment when the drill bit of a power drill is penetrating a work piece or at the ignition of engines of vehicles, the motors require a large impulse torque demanding more current output from battery B. Along with an increasing DC current flowing through S and exceeding the turn-on threshold of S, the switch of S is closed and the electromagnetic relay is switched from normally closed to normally open (S1-S1$b$, S2-S2$b$ and S3-S3$b$). In a real-time response, the supercapacitors C1 and C2 are connected in series and discharge to generate a high current pulse to M in order to meet the power demand. In the foregoing operation, the discharge of battery B is kept at low rates. Thus, no abrupt voltage drop will occur and the effective operating time of battery is prolonged.

EXAMPLE 1

Figure 3:
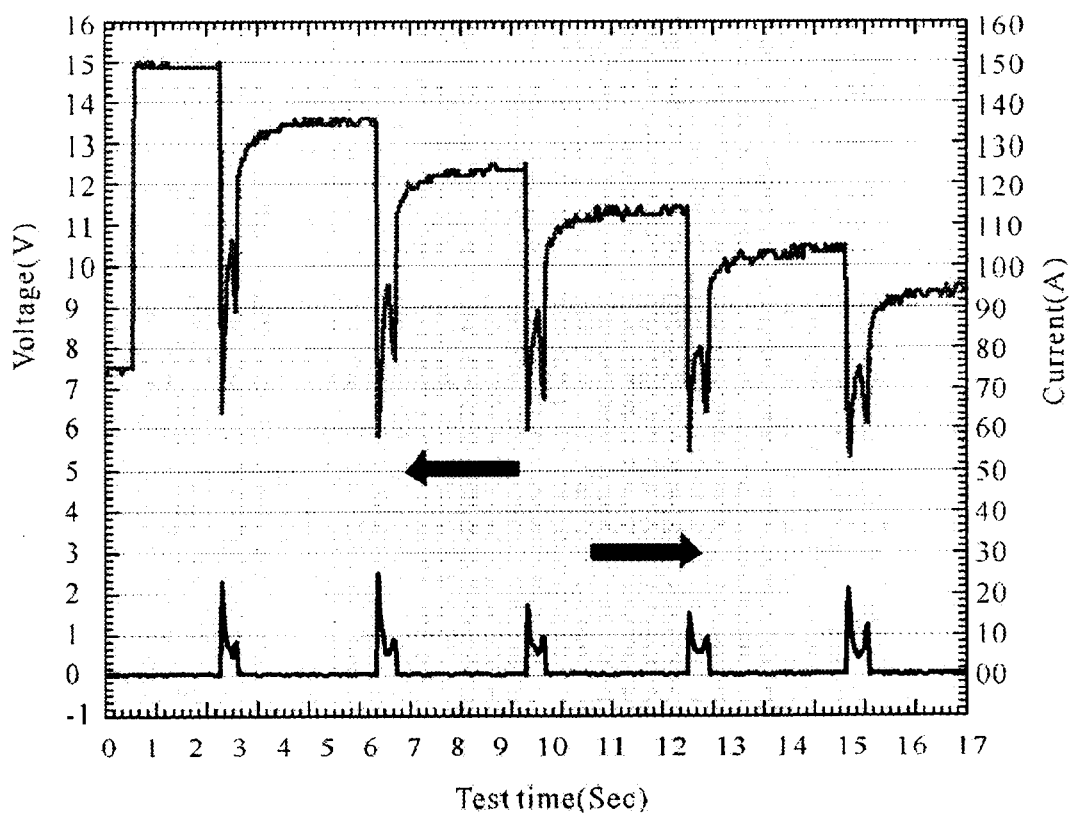
FIG. 3 is a schematic diagram illustrating the voltage and current pulses produced by the generator using alkaline batteries as power source for operating an electric stapler according to another one preferred embodiment of this invention.

Using 6 pieces of 1.5V alkaline batteries and 2 pieces of 7.5V×6F supercapacitors with ESR of 80–100 m Ω, a high current pulses generator as depicted by FIG. 1 is arranged for an electrical stapler that originally relies on 12 pieces of 1.2V×1800 mAh NiCd batteries for operation. Soon after the supercapacitors are charged, the generator can continuously drive 8 pieces of ½-inch staple into the surface of plywood. The discharge curves of voltage and current pulses of the first 5 shot are shown in FIG. 3. The average current required to operate the stapler is 20A that is well above the current output of the aforementioned alkaline batteries. When 6 pieces of the original NiCd batteries or 6 pieces of NiMH batteries of the same capacitance as the NiCd are used for the generator, the stapler is highly energetic and shows no hesitation during operation.

EXAMPLE 2

Using 6 pieces of 3.6V×1600 mAh lithium ion batteries, which are first grouped in 3 sets of double batteries connected in-series, and then the 3 sets are connected in-parallel to form a battery pack of 7.2V×4800 mAh, together with 2 pieces of 6.5V×40F supercapacitors with ESR of 30 m Ω, a high current pulses generator as depicted by FIG. 2 is constructed. The generator is capable of igniting a 2000-ml combustion engine of a 6-cylinder automobile. Also the generator weighed 1.4 lbs. is measured to deliver an electric power of 720 W (12V×60A) for 2 seconds per one full charge of supercapacitors. From the foregoing two examples, the present invention demonstrated the following features:

1. Primary batteries such as alkaline batteries can be used to operate electric power tools.
2. With the assistance of supercapacitors, rechargeable batteries of low power density such as NiMH and lithium ion can be used to replace batteries of high power density such as lead-acid and NiCd for performing heavy-duty jobs.
3. Supercapacitors can enhance the power density of primary and secondary batteries, as well as renewable energy including the aforementioned batteries, fuel cells, solar cells, and metal-air batteries. Furthermore, the power output of the generator consisting of batteries and supercapacitors can be custom-made by adjusting the capacitance of supercapacitors.

The present invention is viable as a power unit for generating impulses of high current and is advantageous in performance, convenience, compact, simplicity, reliability, durability, and cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A high current pulse generator as a power unit for DC powered devices consisting:
   a DC voltage source;
   a plurality of capacitors connected in parallel with each other and with said voltage source, for storing large static charges provided by said voltage source and for releasing said charges;
   a latch coupled to said capacitors, for initiating storing charges of said capacitors;
   a power output sensor coupled to said voltage source, for monitoring a power output of said voltage source;
   a switching element for switching said capacitors into series connection for releasing said charges to generate electric impulses of high current; and
   a trigger coupled to said switching element for initiating switching said capacitors.

2. The high current pulse generator in accordance with claim 1, wherein said voltage source is a primary battery.

3. The high current pulse generator in accordance with claim 2, wherein said primary battery is selected from the following group consisting of an alkaline battery and a metal-air battery.

4. The high current pulse generator in accordance with claim 1, wherein said voltage source is a secondary battery.

5. The high current pulse generator in accordance with claim 4, wherein said secondary battery is selected from the following group consisting of a nickel-metal hydride battery, a lithium ion battery, a lithium polymer battery, a lead-acid battery, a metal-air battery, and a nickel-cadmium battery.

6. The high current pulse generator in accordance with claim 1, wherein said voltage source is a renewable energy produced by using a resource selected from the following group consisting of hydrogen, hydrocarbons alcohol, solar radiation, wind, and hydraulic waves.

7. The high current pulse generator in accordance with claim 1, wherein said capacitor is selected from the following group consisting of a supercapacitor, an ultracapacitor, and an electric double layer capacitor.

8. The high current pulse generator in accordance with claim 7, wherein said capacitor has a working voltage of >/=2.5 V, a capacitance of >/=1 F, and ESR </=100 m Ω.

9. The high current pulse generator in accordance with claim 1, wherein said power output sensor is a solenoid.

10. The high current pulse generator in accordance with claim 1, wherein said switching element is an electromagnetic relay.

* * * * *